United States Patent [19]
Hrassky

[11] Patent Number: 5,559,416
[45] Date of Patent: Sep. 24, 1996

[54] DIRECT CURRENT MOTOR CONTROL CIRCUIT IN POSITIONING SYSTEMS

[75] Inventor: Petr Hrassky, Wasserburg am Inn, Germany

[73] Assignee: SGS-Thomson Microelectronics GmbH, Munich, Germany

[21] Appl. No.: 335,809

[22] PCT Filed: May 14, 1993

[86] PCT No.: PCT/EP93/01212

§ 371 Date: Jan. 31, 1995

§ 102(e) Date: Jan. 31, 1995

[87] PCT Pub. No.: WO93/23920

PCT Pub. Date: Nov. 25, 1993

[30] Foreign Application Priority Data

May 15, 1992 [DE] Germany ............ 42 16 203.3

[51] Int. Cl.⁶ .................. G05B 9/02; H03F 3/45
[52] U.S. Cl. .............. 318/678; 388/815; 318/635; 327/66; 330/257; 330/288
[58] Field of Search ................. 318/566, 294, 318/674, 434, 474, 476, 635, 678, 681; 388/815; 361/30; 327/31, 109, 132, 280, 470, 66, 53; 330/257, 252, 288

[56] References Cited

U.S. PATENT DOCUMENTS

| | | | |
|---|---|---|---|
| 3,656,006 | 4/1972 | Bourke et al. | 327/381 |
| 4,290,000 | 9/1981 | Sun | 318/681 |
| 5,140,591 | 8/1992 | Palara et al. | 327/109 |
| 5,160,896 | 11/1992 | McCorkle | 327/31 |

*Primary Examiner*—John W. Cabeca
*Attorney, Agent, or Firm*—Seed and Berry LLP; David V. Carlson; Michael J. Donohue

[57] ABSTRACT

A control circuit, in particular for a direct current control in positioning systems, comprising a differential circuit (1), a control logic (2) and a full bridge (3) connected between a supply voltage $V_S$ and a reference potential GND. The differential circuit (1) has a first hysteresis comparator (HC1) and a second hysteresis comparator (HC2). The two comparator inputs (HC1−, HC1+, HC2−, HC2+) of the two hysteresis comparators (HC1, HC2) are connected each to one of two input terminals (IN1, IN2) of the control circuit and crosswise to a comparator input of the respective other comparator (HC1, HC2). The inverting input of each comparator (HC1, HC2) is connected to the non-inverting input of the respective other comparator.

4 Claims, 12 Drawing Sheets

| TRANSFER FUNCTION OF FIG. 2A | | | | |
|---|---|---|---|---|
| $HC1_0$ | 1 | 0 | 0 | 1 |
| $HC2_0$ | 0 | 0 | 1 | 1 |
| OUT 1 | 0 | 1 | 1 | TS |
| OUT 2 | 1 | 1 | 0 | TS |
| OUT1 − OUT2 | − | 0 | + | TS |

| TRANSFER FUNCTION OF FIG. 2B | | | | |
|---|---|---|---|---|
| $HC1_0$ | 0 | 1 | 1 | 0 |
| $HC2_0$ | 1 | 1 | 0 | 0 |
| OUT 1 | 0 | 1 | 1 | TS |
| OUT 2 | 1 | 1 | 0 | TS |
| OUT 1 – OUT 2 | – | 0 | + | TS |

DIRECT CURRENT MOTOR CONTROL CIRCUIT IN POSITIONING SYSTEMS

The invention relates to a control circuit, in particular for a direct current motor control in positioning systems.

Such a control circuit is known from the publication Siemens Components 27 (1989), No. 2, pages 79 to 82.

Positioning systems equipped with direct current motors are frequently used for keeping a mechanical variable, e.g. a linear movement or a tilting movement, in track with an adjustable electrical voltage. Such positioning systems may be used in an automobile for controlling the position of air duct dampers, or the position of headlights to compensate for variable load conditions. Motor positioning systems are also used in computers in applications such as positioning a magnetic head on a hard disk drive.

FIG. 9 shows a control circuit for positioning systems with direct current motors according to the prior art. The direct current motor to be controlled is connected between the output of a first operational amplifier OP1 and the output of a second operational amplifier OP2. A voltage divider constituted by a first voltage divider resistor R1, a second voltage divider resistor $R_2$ and a third voltage divider resistor $R_3$ is connected between a voltage supply $V_S$ and a reference potential GND. The inverting input of the first operational amplifier OP1 is connected to the connecting node between the second voltage divider resistor $R_2$ and the third voltage divider resistor R3. The non-inverting input of the second operational amplifier is connected to the connecting node between the first voltage divider resistor $R_1$ and the second voltage divider resistor $R_2$. The non-inverting input of the first operational amplifier OP1 is connected to the inverting input of the second operational amplifier OP2; the two latter inputs are fed with an input voltage $V_{IN}$. Between the outputs of the two operational amplifiers there is connected a direct current motor. Mechanically coupled therewith is a potentiometer $R_F$ detecting the actual value of the rotational position of the motor. This actual value is fed back via a feedback resistor $R_R$ to an input of operational amplifier OP1. This input furthermore is connected via a resistor $R_{IN}$ to the tap of a nominal value potentiometer $R_C$.

FIG. 10 illustrates the transfer function of this known circuit according to FIG. 9. Plotted on the abscissa is the input voltage $V_{IN}$, whereas the differential output voltage $V_{OUT}$ is plotted on the ordinate. When the input voltage $V_{IN}$ is lower than $V_1$, the differential output voltage $V_{OUT}$ is negative and in its amount virtually corresponds to the supply voltage $V_S$. The motor thereby rotates in a first direction, for example in a right-hand rotation. When the input voltage $V_{IN}$ is continuously increased until it exceeds a threshold value $V_1$ corresponding to the potential at the connecting site between resistors $R_2$ and $R_3$, the differential output voltage $V_{OUT}$ changes to the value of zero volt. The motor stops. When upon further increase of the input voltage a threshold value $V_2$ is exceeded, which corresponds to the potential at the connecting site between resistors $R_1$ and $R_2$, the differential output voltage $V_{OUT}$ increases to a positive value which virtually corresponds to the amount of the supply voltage $V_S$. The motor then rotates in a second direction, namely in a left-hand rotation in the example assumed.

A problem of the circuit shown in FIG. 9 is that it displays a linear behavior in the range of the threshold values $V_1$, $V_2$ and in practical realization therefore requires an output compensation circuit (Boucherot member). In addition thereto, this circuit involves a sensitive reaction to interference voltages superimposed on the input voltage, especially when $V_{IN}$ after stopping of the motor is close to one of the thresholds $V_1$ and $V_2$.

It is desirable to have a control circuit which involves hysteresis in the switching thresholds $V_1$ and $V_2$ and furthermore is adapted to process also differential signals.

Such a control circuit suitable for positioning control, e.g. with direct current motors, has a transfer characteristic as shown in FIG. 11. According to this figure, there are three different starting conditions: positive output voltage causing e.g. a left-hand motor rotation; output voltage zero, at which the motor is short-circuited and which thus means a stop condition; negative output voltage causing right-hand motor rotation in the particular example. The input voltages are the nominal and actual voltages of the positioning system. The input voltage difference $V_{dIN}$ represents the difference between these voltages.

The function of the control circuit and the insensitiveness to interferences of the positioning system may be elucidated from the shape of the transfer characteristic indicated in FIG. 11. With a negative input voltage difference $V_{dIN}<V_{dn-}$, a negative voltage is applied to the motor, which rotates in right-hand direction. The input voltage difference is increased thereby; when the threshold $V_{dp-}$ is reached, the output voltage of the comparator circuit becomes zero and the motor is stopped in the position reached. The positioning accuracy is determined by the difference $V_{dp}$ reached between the nominal and actual voltages.

$$V_{dp-} \leq = V_{dp} \leq = V_{dp+}.$$

Upon reaching of the stop condition, the motor remains decelerated as long as $V_{dIN}$ has not exceeded one of the threshold values $V_{dn-}$ or $V_{dn+}$. The distance between the thresholds $V_{dn-}$ and $V_{dp-}$ on the one hand and the thresholds $V_{dn+}$ and $V_{dp+}$ (hysteresis) on the other hand determines the insensitiveness of the positioning system to interferences. An interference voltage with an amplitude of up to $V_{dN} \leq = V_{dN+} - V_{dp+}$, which is superimposed on the actual or the nominal input voltage, can be handled without having an effect on the motor position reached when the positive portion of $V_{dIN}$ is considered. The same applies to the negative portion when it is assumed that the behavior with respect to offset and hysteresis is the same in the negative portion and in the positive portion.

It is thus an object of the invention to make available a control circuit according to the generic clause of the main claim, which can be integrated in inexpensive manner while displaying the desired transfer behavior according to FIG. 11.

This object is met by the features indicated in patent claim 1 and may be developed in advantageous manner according to the dependent claims.

The circuit according to the invention comprises an analog differential input having a large common mode region. The input offset voltages necessary for realizing the desired transfer characteristic are generated internally in the differential input stages of the hysteresis comparators. The desired transfer characteristic according to FIG. 11 is realized by the wiring of the comparator inputs and the adaptation of the transfer function of the further circuit parts.

The advantages achieved by the invention in particular consist in that they make available a control circuit, in particular for a direct current motor control in positioning systems, which may also be employed in an environment affected by electromagnetic interference fields, for example in a motor vehicle. In addition thereto, a control circuit, in particular for direct current motor control in positioning systems, is made available which can be realized with few components, in particular also in the form of an integrated circuit (IC).

Further advantages and developments are gatherable from the embodiments.

A preferred embodiment of the invention makes use of a hysteresis comparator in which both the hysteresis values and the offset values can be adjusted without any problem while requiring very few component parts and thus little chip area in the case of monolithic integration.

The reference Siemens Components 27 (1989), No. 2, pages 79 to 82, reveals an integrated driver circuit for a full bridge current supply for electric motors which is free from transverse currents and in which each half bridge is digitally controlled via a control input of its own, and a separate control branch extends from each control input to the respective associated half bridge, with each control input being followed by a hysteresis element of its own in the form of a Schmitt trigger for definitely generating a digital control signal for the bridge circuit. However, the hysteresis elements do not constitute a differential circuit. This means, on the control input side there is provided one input Schmitt trigger for each one of two control signal inputs, in order to achieve an as definite switching behavior as possible also in case of digital input signals affected by interferences. The two control signal inputs serve for separately supplying control signals for control of the one and the other bridge branch, respectively, of a full bridge circuit driving a direct current motor. However, there is no differential circuit operation involved, as it is essential for the control circuit according to the present invention.

In the control circuit for a motor control clocked for four quadrants, as known from the publication EPE Proceedings, 1991, Vol. 3, pages 3–562 to 3–567, each comparator has a separate reference voltage source of its own associated therewith. The reference voltages are dimensioned such that the desired four quadrant behavior can be obtained. An offset is preset for each of the four comparators from the outside via its associated reference voltage source. The hysteresis of these comparators determines the current stroke of the clocked current control carried out.

The invention will now be elucidated by way of several embodiments. In the drawings FIG. 1 shows a circuit diagram of a general embodiment of a control circuit according to the invention;

Figure 11:
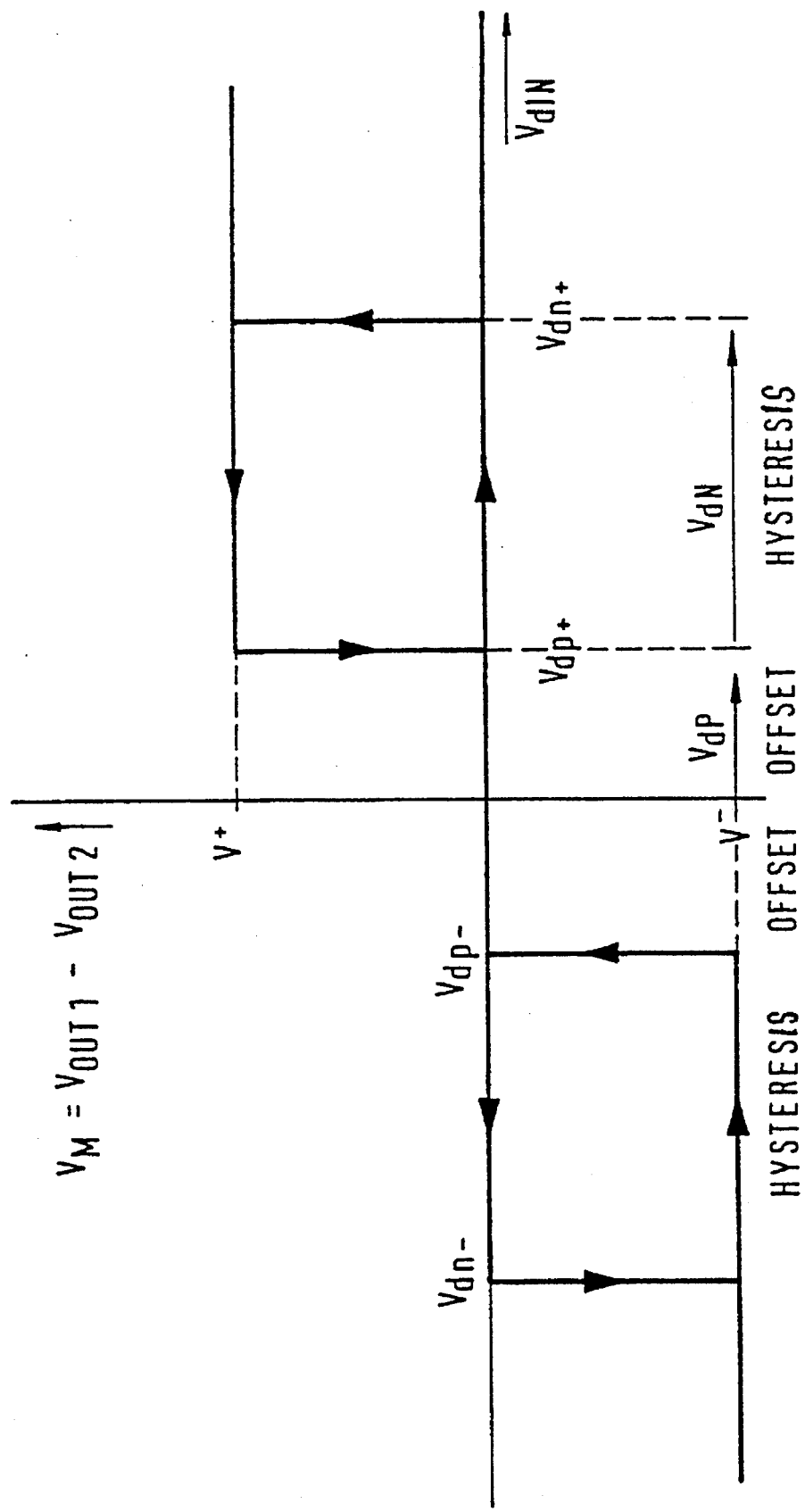
FIG. 11 shows a transfer function of known type with hysteresis behavior.

FIG. 11 shows a diagram of a known-per-se transfer function with hysteresis behavior, which constitutes a basis for the invention. Plotted on the ordinate is the difference $V_M$ of the output voltages $V_{OUT1}$ and $V_{OUT2}$ of a control circuit as a function of the difference $V_{dIN}$ of the input voltages IN1 and IN2 of a control circuit, which is plotted on the abscissa. At a value of the differential voltage $V_{dIN}=0$ V, the difference $V_M$ of the output voltage $V_M=0$ V. When the differential voltage $V_{dIN}$ is gradually increased starting from zero volt, the difference $V_M$ of the output voltages at a predetermined value $V_{dIN}=V_{dn+}$ increases from $V_M=0$ V to a positive voltage level $V^+$. When the differential voltage $V_{dIN}$ is then gradually decreased again, the difference $V_M$ of the output voltages, at a value $V_{dIN}=V_{dp+}$, jumps from $V_M=V^+$ to zero volt. When the differential voltage $V_{dIN}$ is gradually decreased starting from zero volt, the difference $V_M$ of the output voltages, at a value $V_{dIN}=V_{dn-}$, jumps from $V_M=0$ V to a negative voltage level $V^-$. When the differential voltage $V_{dIN}$ is then gradually increased again, the difference $V_M$ of the output voltages, at a predetermined value $V_{dIN}=V_{dp-}$, jumps from $V_M=V^-$ to zero volt.

In the following, the function of a control circuit with the afore-described transfer function shall be described in a positioning system. At a negative differential voltage $V_{dIN}$, with $V_{dIN}<V_{dn-}$, the motor is thus acted upon with a negative voltage and rotates, for example, towards the right. In so doing, the differential voltage $V_{dIN}$ increases. When the threshold $V_{dp-}$ is reached, the output voltage becomes zero, and the motor is stopped in the position reached. This condition is maintained until the differential voltage $V_{dIN}$ passes one of the threshold values $V_{dn-}$ or $V_{dn+}$. The distance between the thresholds $V_{dn-}$ and $V_{dp-}$ on the one hand and $V_{dn+}$ and $V_{dp+}$ on the other hand (hysteresis) determines the insensitiveness of the system to interferences. An interference voltage $V_{dN}$ superimposed on the input voltage and having an amplitude of $V_{dN}<V_{dn+}-V_{dp+}$ can be handled without having an effect on the motor position. The same applies again in corresponding manner for the negative portion of $V_{dIN}$.

For the voltage interval between the values $V_{dp-}$ and $V_{dp+}$ for the differential voltage $V_{dIN}$, the direct current motor to be controlled is short-circuited in order to reduce afterrunning.

Figure 1:
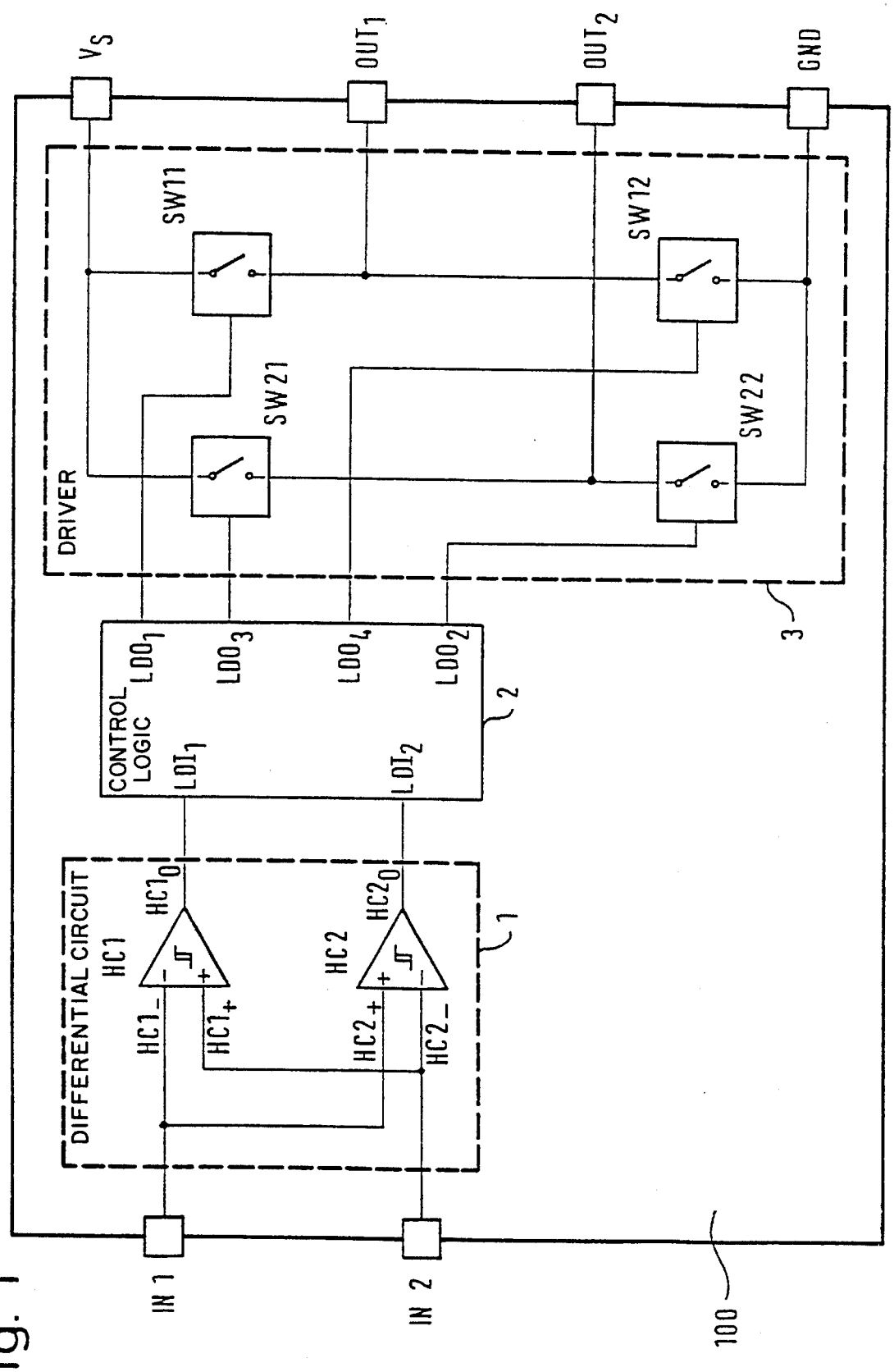

FIG. 1 shows a circuit diagram of a general embodiment of a control circuit 100 according to the invention, comprising a differential circuit 1, a control logic 2 and a full bridge 3. A first analog input IN1 of control circuit 100 is connected directly to a first differential input HC1 of a first hysteresis comparator HC1 as well as to a second differential input HC2$_+$ of a second hysteresis comparator HC2 of differential circuit 1. A second analog input IN2 of control circuit 100 is connected directly to a second differential input HC1$_+$ of the first hysteresis comparator HC1 as well as to a first differential input HC2 of the second hysteresis comparator HC2. The control logic 2 having a first input LDI$_1$, a second input LDI$_2$, a first output LDO$_1$, a second output LDO$_2$, a third output LDO$_3$, and a fourth output LDO$_4$ is followed by the full bridge 3 connected between a supply voltage $V_S$ and a reference potential GND and consisting of a first halfbridge with first and second switch means SW11, SW12 controllable via one control input each, as well as a second half-bridge with third and fourth switch means SW21, SW22 controllable via one control input each, with an output HC1$_0$ of the first hysteresis comparator HC1 being connected directly to the first logic input LDI$_1$ of control logic 2. In corresponding manner, an output HC2$_0$ of the second hysteresis comparator HC2 is connected directly to the second logic input LDI$_2$ of control logic 2. Furthermore, the first, second, third, and fourth outputs LDO$_1$, LDO$_2$, LDO$_3$, LDO$_4$ of control logic 2 are each connected to the control input of said first, second, third, and fourth switch means SW11, SW12, SW21, SW22, respectively.

A first control circuit output OUT1 is connected to the bridge tap of the first half bridge SW11, SW12, and a second control circuit output OUT2 is connected to the bridge tap of the second half bridge SW21, SW22. Each of the controllable switch means SW11, SW12, SW21, SW22 is adapted to have its switching path controlled into a conducting or a blocking switching state, depending on whether the associated control input is at a first or a second potential.

Figure 2A:
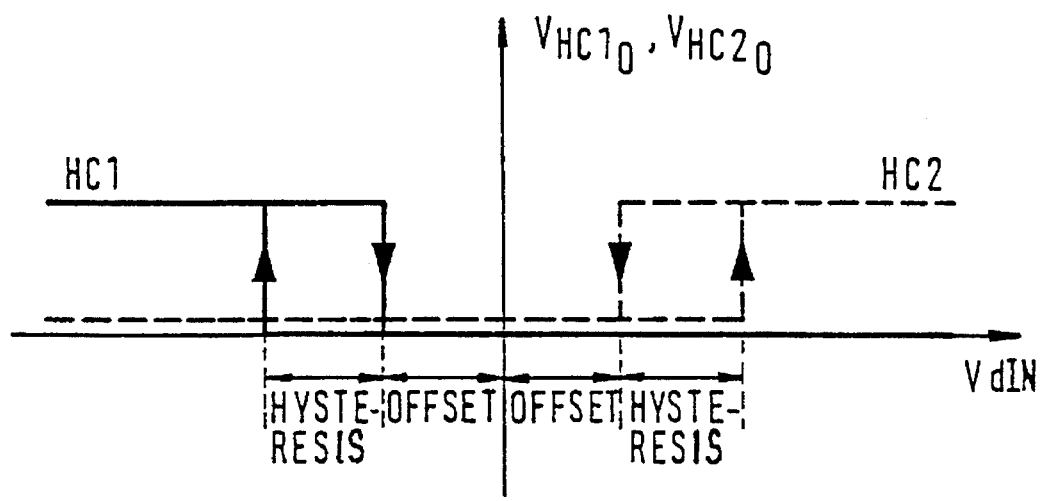
FIG. 2 shows transfer functions in connection with a first embodiment (FIG. 2A) and a second embodiment (FIG. 2B), respectively, of the solution according to the invention.
Figure 2B:
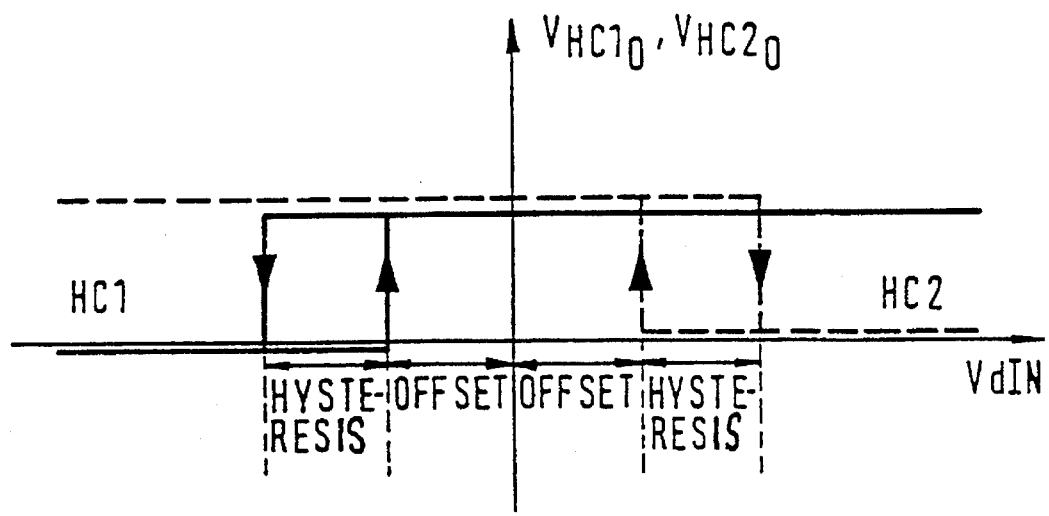

The comparator circuit 1 may be designed for different transfer functions depending on the hysteresis switching behavior of each of the two hysteresis comparators HC1 and HC2 as well as the cooperation thereof. FIGS. 2A and 2B illustrate two different examples of such transfer functions. The transfer function of hysteresis comparator HC1 is shown in each figure in full lines, whereas the transfer function of hysteresis comparator HC2 is shown in each figure in broken lines. The figures each show the output voltage $V_{HC10}$ of hysteresis comparator HC1 and the output voltage $V_{HC20}$ of hysteresis comparator HC2, respectively, as a function of the input voltage $V_{dIN}$.

The different transfer functions according to FIGS. 2A and 2B are brought about when the connection system on the input side of the comparator circuit 1 is changed with respect to the connection system depicted in FIG. 1. FIG. 2A shows the transfer function of the comparator circuit 1 according to FIG. 1. When the two inputs are exchanged in the two hysteresis comparators HC1, HC2, a transfer function according to FIG. 2B is created.

The different transfer characteristics of differently designed comparator circuits 1 cause embodiments of the output circuit constituted by control logic 2 and full bridge 3 which have different effects. FIGS. 2A and 2B each have a transfer function associated therewith, which indicates the transfer behavior of this output circuit which is to be associated with each one of the transfer functions shown in FIGS. 2A and 2B so that a motor connected to the output terminals OUT1 and OUT2 shows the same behavior in all embodiments. The symbols used in the various transfer function tables have the following meanings:

1: a first potential or current condition

0: a second potential or current condition

TS: a tri-state condition (high-impedance output)

−: motor rotation in a first direction

+: motor rotation in a second direction of rotation

Figure 3:
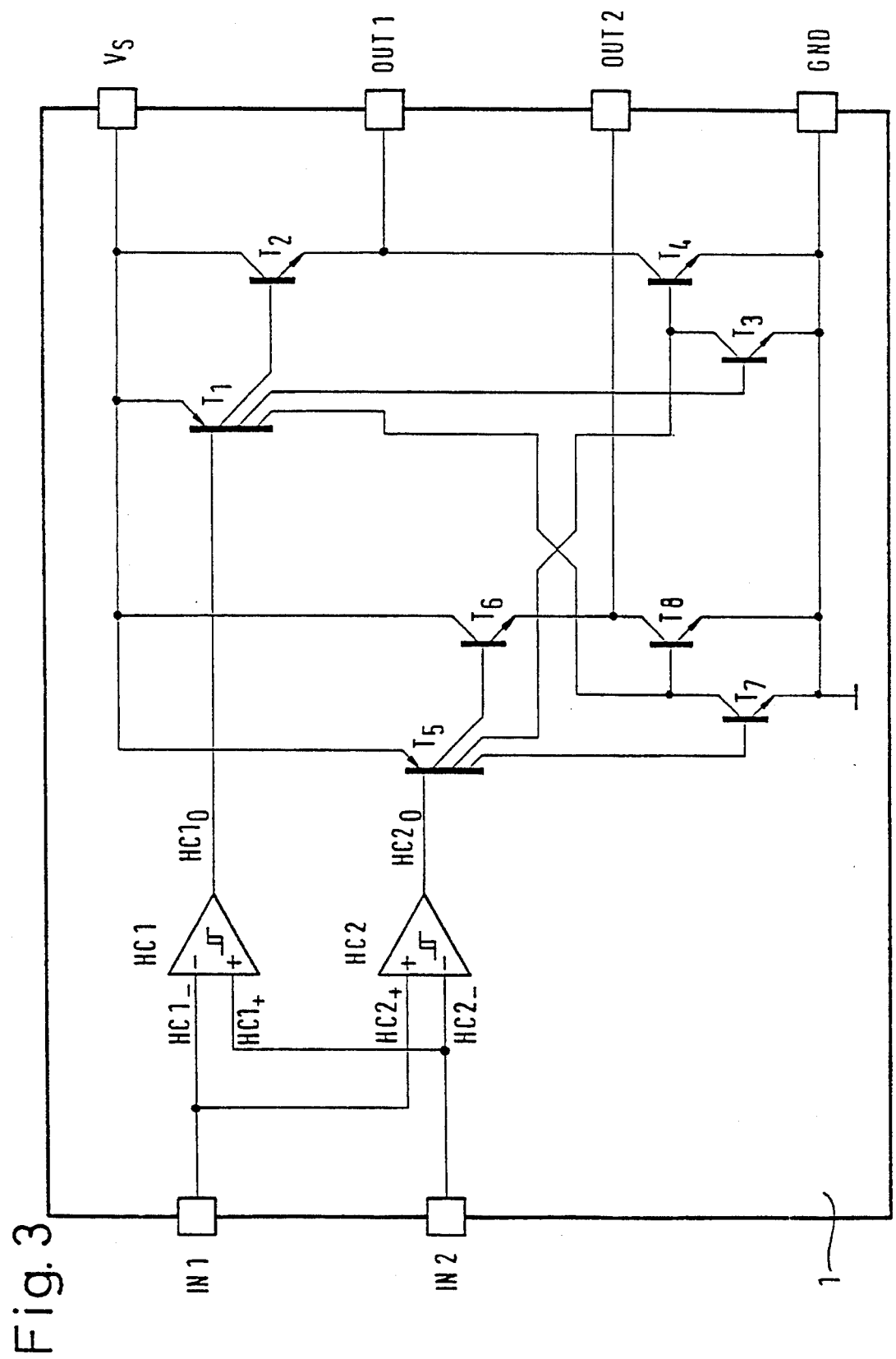
FIG. 3 shows a basic circuit diagram of a first embodiment of a control circuit of the invention according to FIG. 1.

FIG. 3 shows a detailed circuit diagram of a first embodiment of a control circuit of the invention according to FIG. 1, realizing a transfer behavior according to FIG. 2A. The connection of the hysteresis comparators HC1 and HC2 corresponds to the arrangement already shown in FIG. 1 and elucidated hereinbefore; reference is made to these statements. The full bridge 3 shown in FIG. 1 as an aggregate of controllable switch means SW11, SW12, SW21, SW22, as well as the associated control logic 2 are realized in a preferred embodiment in terms of circuit design as shown in FIG. 3. Corresponding to the first, second, third, and fourth controllable switch means SW11, SW12, SW21, SW22 in FIG. 1 is a first, second, third, and fourth npn switching transistor T2, T4, T6, T8, respectively, with the switching path of each switch means implemented in the form of a transistor being designed each as a collector-emitter path of the respective transistor. The associated base serves as a control input for the respective transistor. The control logic 2 is implemented by a first pnp multicollector transistor T1, a second pnp multicollector transistor T5 as well as a first npn auxiliary transistor T3 and a second npn auxiliary transistor T7. The collector-emitter path of first npn auxiliary transistor T3 is connected in parallel to the base-emitter path of second switching transistor T4. The collector-emitter path of second npn auxiliary transistor T7 is connected in parallel to the base-emitter path of the fourth switching transistor T8. The base of first switching transistor T2 is connected to a first collector of the first multicollector transistor T1. A second collector of first multicollector transistor T1 is connected to the base of first auxiliary transistor T3. The base of fourth switching transistor T8 is connected to a third collector of the first multicollector transistor T1. In corresponding manner, the base of third switching transistor T6 is connected to a first collector of the second multicollector transistor T5. A second collector of second multicollector transistor T5 is connected to the base of second auxiliary transistor T7. The base of second switching transistor T4 is connected to a third collector of the second multicollector transistor T5.

The related transfer function table is shown beside FIG. 2A.

The circuit shown in FIG. 3, just as the embodiments elucidated hereinafter, may in principle also be composed with field effect transistors.

Figure 4:
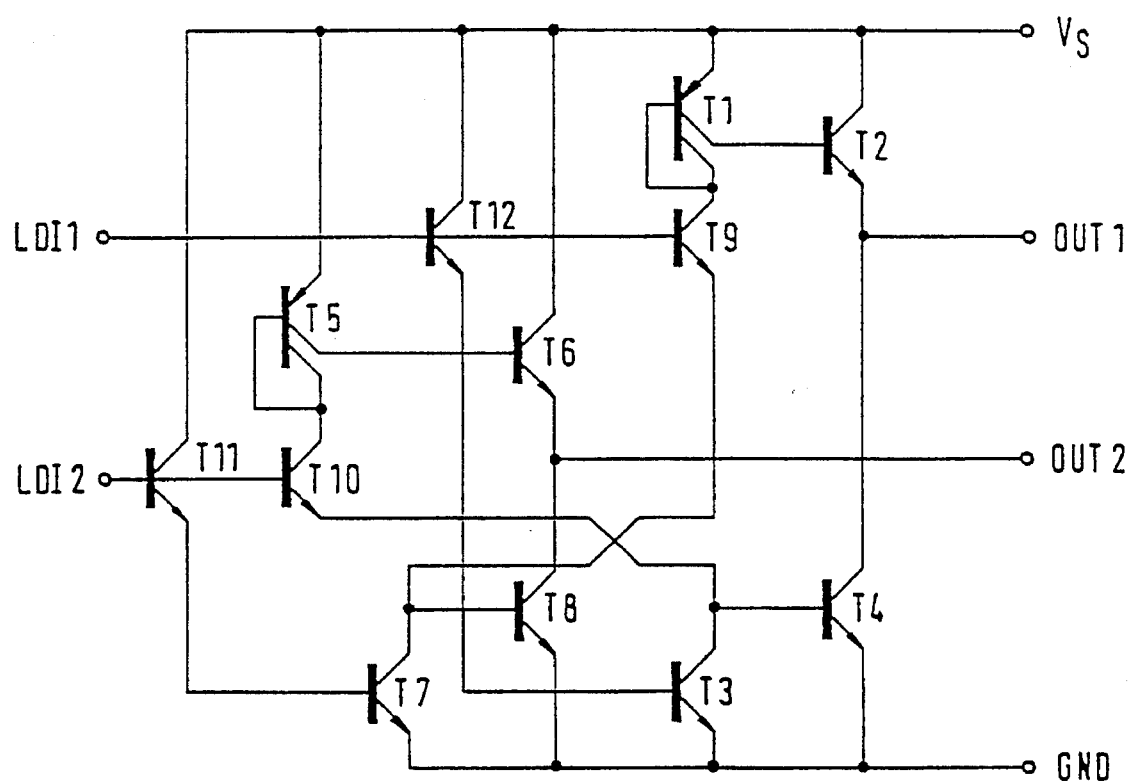
FIG. 4 shows a basic circuit diagram of a control logic and a full bridge of a second embodiment of a control circuit of the invention according to FIG. 1.

FIG. 4 shows a detailed block diagram of the control logic 2 and the full bridge 3 of a second embodiment of a control circuit of the invention according to FIG. 1, realizing a transfer behavior of the transfer function table relating to FIG. 2B. The connection of the hysteresis comparators HC1 and HC2 corresponds to the arrangement already shown in FIG. 1 and elucidated hereinbefore; reference is made to these statements. The full bridge shown in FIG. 1 as an aggregate of controllable switch means SW11, SW12, SW21, SW22, as well as the associated control logic 2 are realized in a preferred embodiment in terms of circuit design as shown in FIG. 4. Corresponding to the first, second, third, and fourth controllable switch means SW11, SW12, SW21, SW22 in FIG. 1 is a first, second, third, and fourth npn switching transistor T2, T4, T6, T8, respectively, with the switching path of each switch means implemented in the form of a transistor being designed each as a collector-emitter path of the respective transistor. The associated base serves as a control input for the respective transistor. The control logic 2 is implemented by a first pnp multicollector transistor T1, a second pnp multicollector transistor T5, a first npn auxiliary transistor T3, a second npn auxiliary transistor T7, a third npn auxiliary transistor T9, a fourth npn auxiliary transistor T10, and a fifth npn auxiliary transistor T11. The collector-emitter path of first npn-auxiliary transistor T3 is connected in parallel to the base-emitter path of second switching transistor T4. The collector-emitter path of second npn auxiliary transistor T7 is connected in parallel to the base-emitter path of the fourth switching transistor T8. The base of first switching transistor T2 is connected to a first collector of the first multicollector transistor T1. The base of third switching transistor T6 is connected to a first collector of the second multicollector transistor T5. The base of second switching transistor T4 is connected to the emitter of the fourth npn auxiliary transistor T10. The base of fourth switching transistor T8 is connected to the emitter of the third npn auxiliary transistor T9. A second collector terminal of first multicollector transistor T1 as well as the base thereof are connected to the collector of the third npn auxiliary transistor T9. In corresponding manner, a first collector terminal as well as the base terminal of second multicollector transistor T5 are connected to the collector of the fourth npn auxiliary transistor T10. The base of first npn auxiliary transistor T3 is connected to the emitter of the sixth npn auxiliary transistor T12. The table beside FIG. 2B shows the truth table of control logic 2 of the second embodiment of a control circuit according to the invention.

Figure 5:
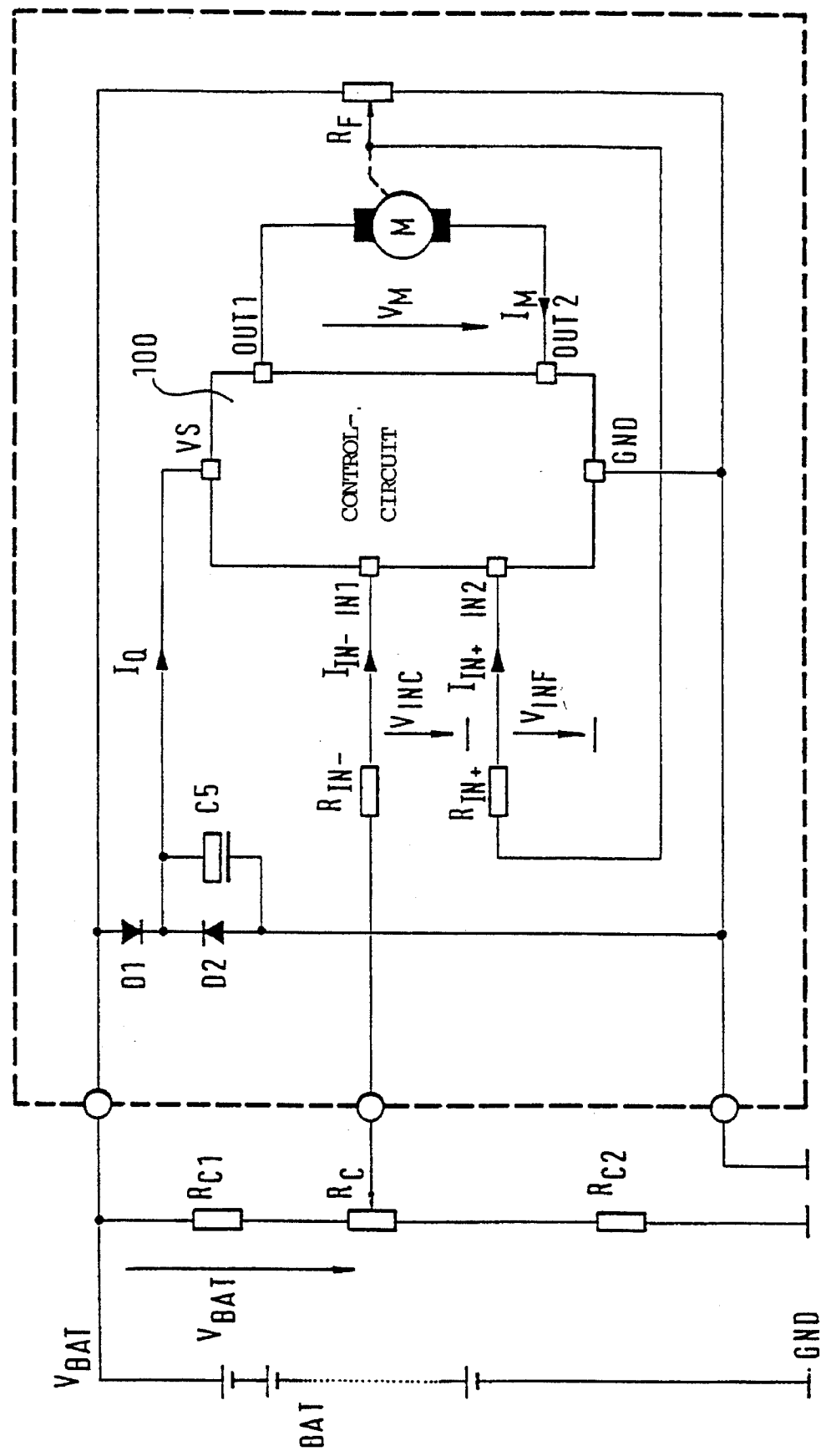
FIG. 5 shows a circuit diagram of a first application of a control circuit according to the invention.

FIG. 5 shows a circuit diagram of a first application of the general embodiment of a control circuit according to the invention as shown in FIG. 1. First analog input IN1 of control circuit 100 is connected via a first preresistor $R_{IN-}$ to the sliding contact of a first potentiometer $R_C$ whose end terminals are connected via a second preresistor $R_{C1}$ and third preresistor $R_{C2}$, respectively, to a voltage source BAT and to a reference potential GND, respectively. Furthermore, the supply voltage $V_{BAT}$ of voltage source BAT is supplied to the control circuit 100 in usual manner via a terminal VS. Finally, the control circuit is connected to the reference potential via a terminal GND. A direct current motor M to be controlled is mechanically coupled with a second potentiometer $R_F$ connected between the supply voltage $V_{BAT}$ and the reference potential GND, so that a predetermined position of the sliding contact of the second potentiometer $R_F$ corresponds to each mechanical operating condition of the system to be positioned. The sliding contact tap of the second potentiometer $R_F$ is connected to the second control circuit input IN2 via a fourth preresistor $R_{IN+}$.

Figure 6:
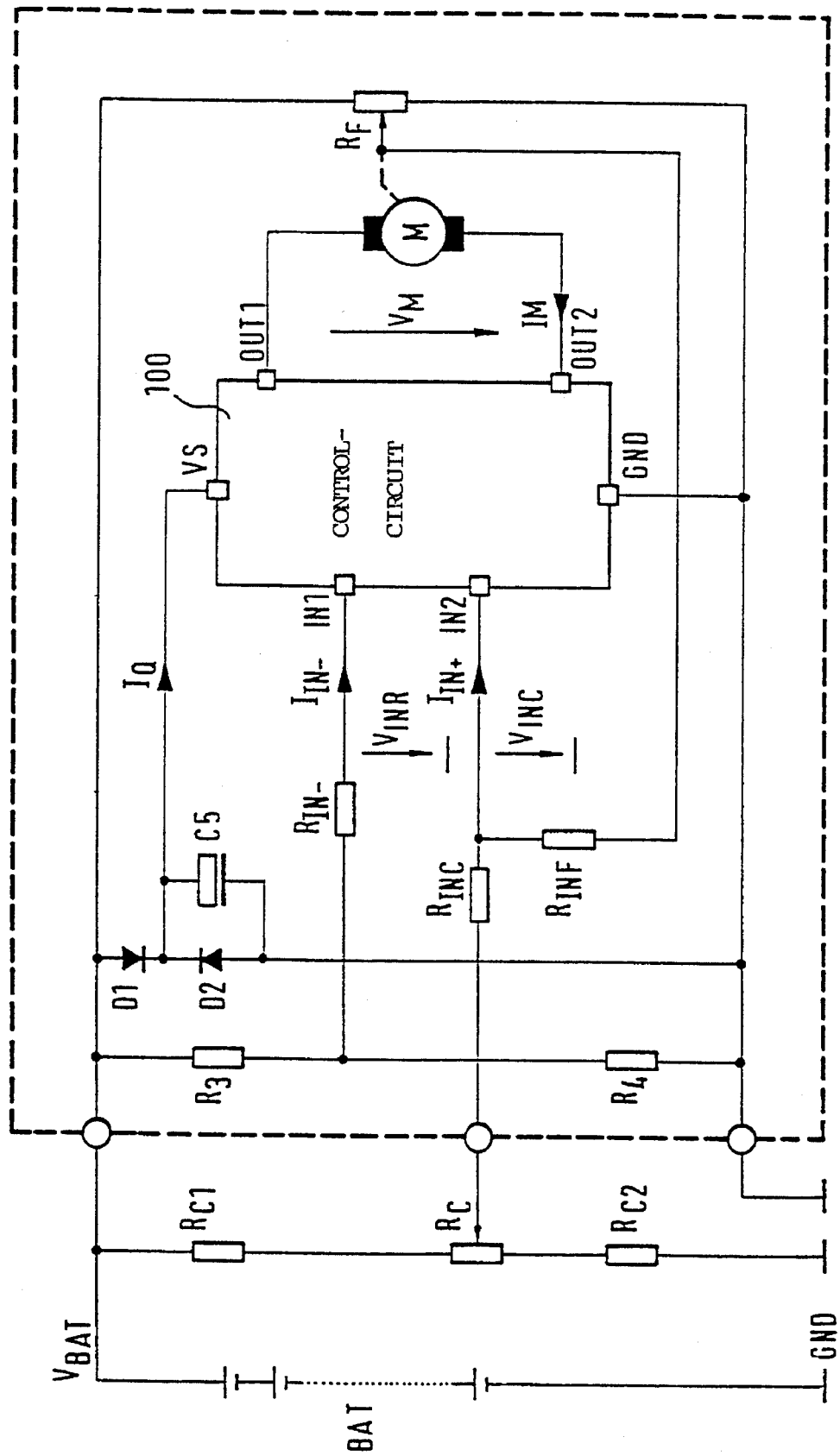
FIG. 6 shows a circuit diagram of a second application of a control circuit according to the invention.

FIG. 6 shows a circuit diagram of a second application of the embodiment of a control circuit of the invention according to FIG. 1. The first analog input IN1 of control circuit 100 is connected via a first preresistor $R_{IN-}$ to the center tap of a voltage divider $R_3$, $R_4$ connected between the supply voltage $V_{BAT}$ and the reference potential GND. The second analog input IN2 of control circuit 100 is connected via a fifth preresistor $R_{INC}$ to the sliding contact of a first potentiometer $R_C$, whose end terminals are again connected via a second preresistor $R_{C1}$ and third preresistor $R_{C2}$, respectively, to the voltage source BAT and to the reference potential GND, respectively. Moreover, the supply voltage $V_{BAT}$ of the voltage source BAT is fed to the control circuit 100 in usual manner via a terminal VS. Finally, the control circuit is connected to the reference potential via a terminal GND. A direct current motor M to be controlled is mechanically coupled with a second potentiometer $R_F$ connected between supply voltage $V_{BAT}$ and reference potential GND, so that a predetermined position of the sliding contact of the second potentiometer $R_F$ corresponds to each mechanical operating condition of the system to be positioned. The sliding contact tap of the second potentiometer $R_F$ is connected to the second control circuit input IN2 via a fourth preresistor $R_{INF}$.

Figure 7:
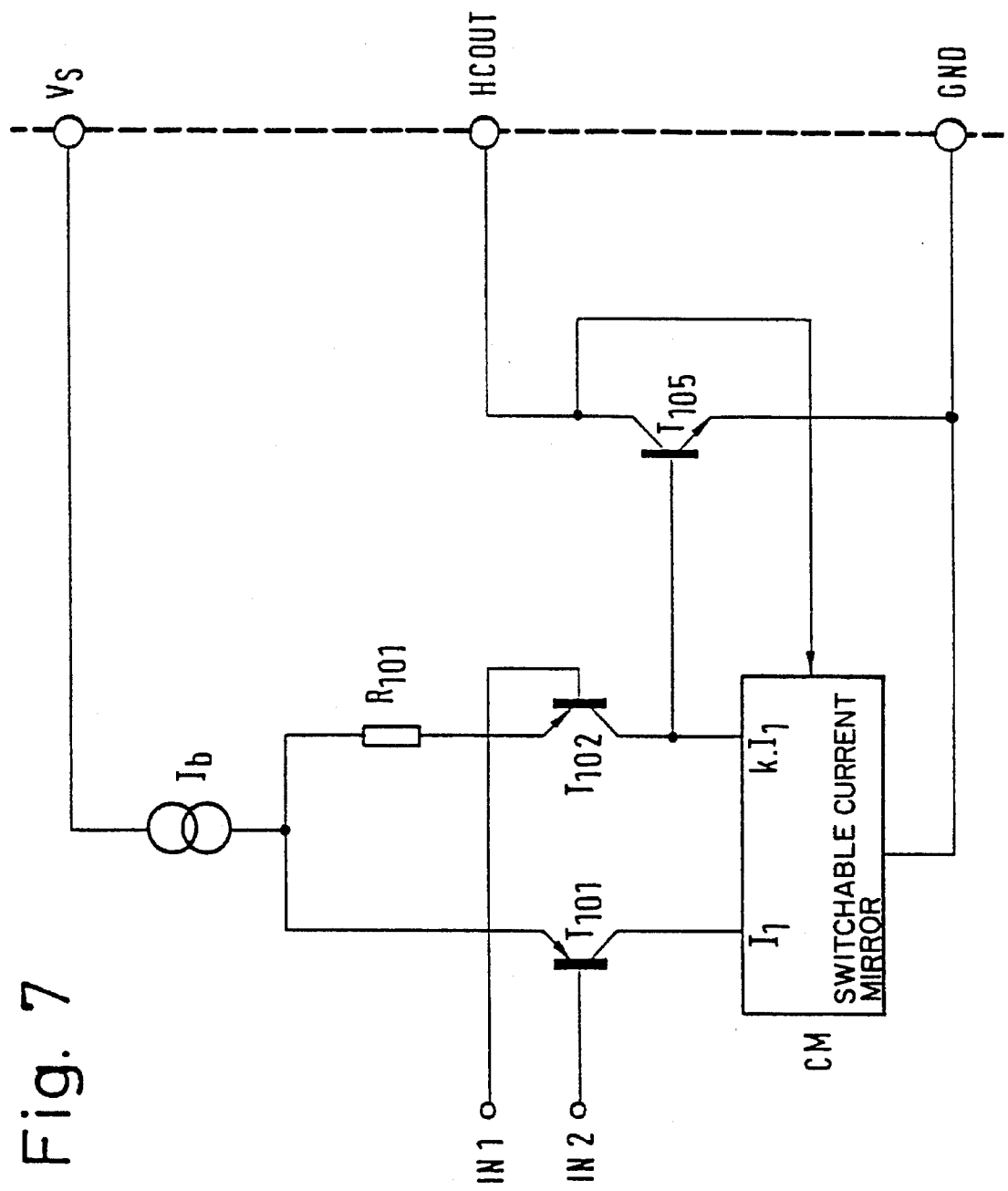
FIG. 7 shows a circuit diagram illustrating an embodiment of the basic structure of each one of the hysteresis comparators in FIGS. 1 and 4.

FIG. 7 shows a circuit diagram illustrating an embodiment of the basic construction of each hysteresis comparator HC1 and HC2, respectively, in FIG. 1. The circuit shown in FIG. 7 consists of an asymmetrical emitter-coupled differential amplifier (differential input stage) $I_b$, $R_{101}$, $T_{101}$, $T_{102}$ comprising a controllable current mirror CM and a decoupling transistor $T_{105}$ for coupling out the current mirror output signal onto a comparator output HCOUT and for controlling a current mirror switching operation.

The current ratio k of current mirror CM is switchable between two values $k_0$ and $k_1$. The input switching threshold hysteresis is achieved by switching over of the current ratio of the current mirror CM of the differential input stage in response to the initial state of this stage. The amount of the input switching threshold hysteresis is determined by the value of the biasing current ($I_b$) and by the difference of the two current ratios $k_0$ and $k_1$ of current mirror CM.

The input difference offset voltage is reached by an asymmetrical emitter negative feedback of transistors T101, T102 by means of resistor R101. With this asymmetrical negative feedback, an input difference offset voltage results which is a function of the biasing current and the current ratio $k_0$ and which is generated by the voltage drop at resistor R101.

Figure 8:
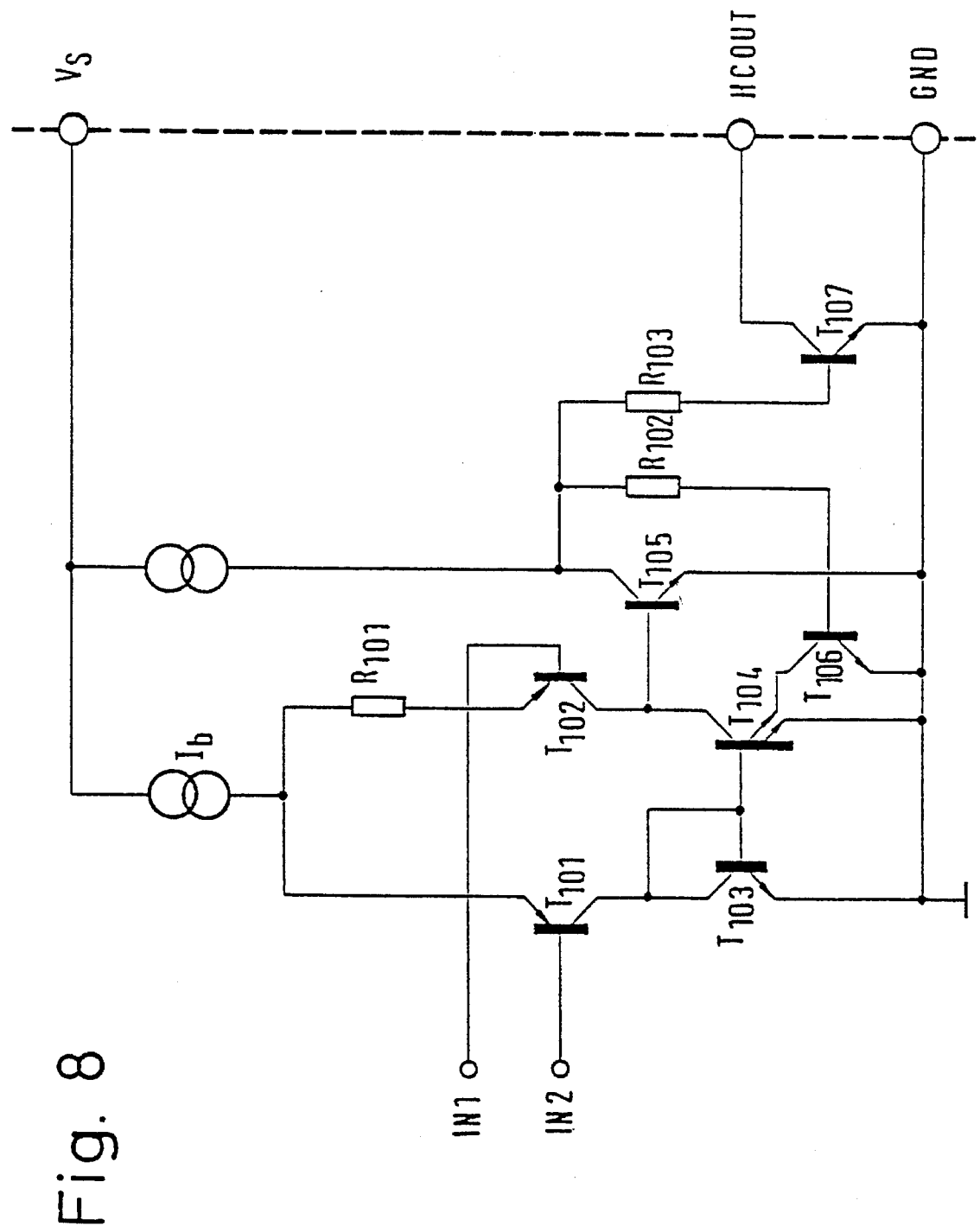
FIG. 8 shows a circuit diagram illustrating details of the hysteresis comparator shown in FIG. 7.
Figure 9:
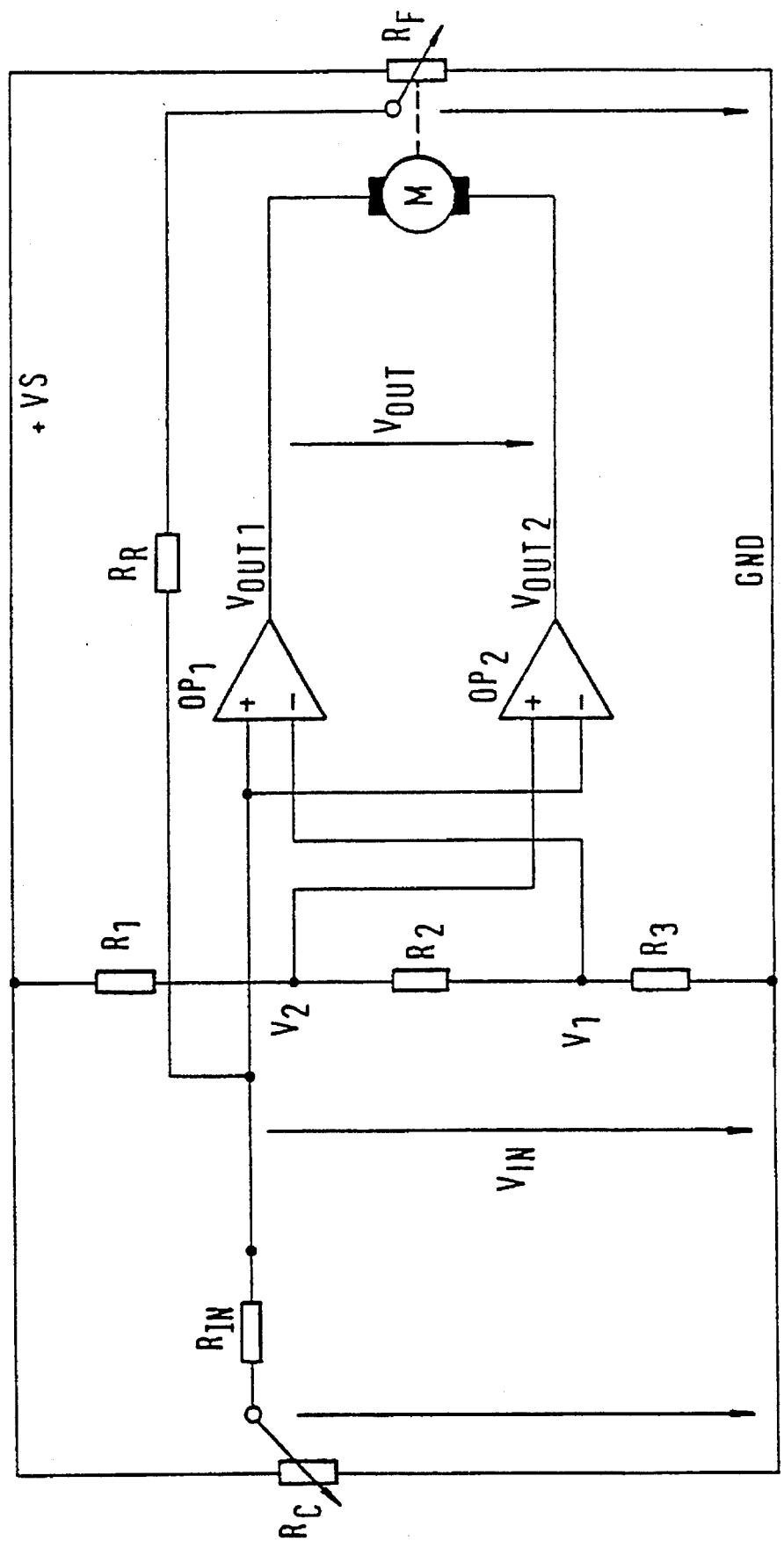
FIG. 9 shows a positioning system comprising a direct current motor according to the prior art.
Figure 10:
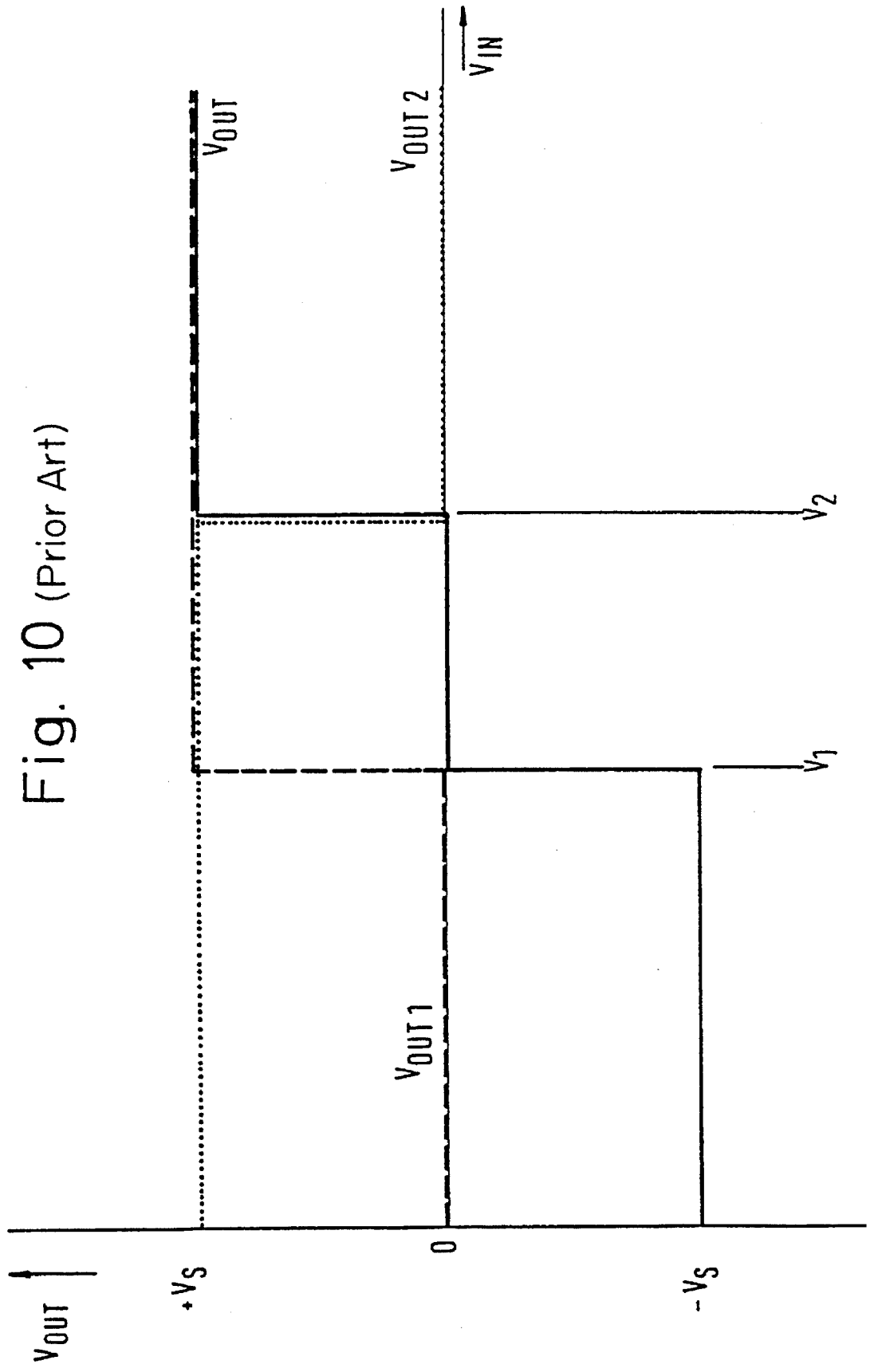
FIG. 10 shows a transfer function of the known circuit according to FIG. 9.

FIG. 8 shows an embodiment of the hysteresis comparator HC1 or HC2, respectively, illustrated in FIG. 7 in its basic form. The circuit shown in FIG. 8 consists of an asymmetrical emitter-coupled differential amplifier $I_b$, $R_{101}$, $T_{101}$, $T_{102}$ comprising a controllable current mirror $T_{103}$, $T_{104}$, $T_{106}$ and a decoupling transistor $T_{105}$ which effects control of the current mirror switching operation, as well as a current mirror output transistor T107.

In the embodiment shown in FIG. 7, the decoupling transistor $T_{105}$ may also be omitted when the circuit is designed in corresponding manner. In this case, current mirror switching is effected directly with an output signal HCOUT.

The controllable current mirror CM depicted in FIG. 8 comprises a first npn current mirror transistor $T_{103}$ and a second npn current mirror transistor $T_{104}$ which is composed as a multi-emitter transistor. The collector and the base of the first current mirror transistor $T_{103}$ are short-circuited with each other. The emitter of the first current mirror transistor $T_{103}$ as well as a first emitter of the second current mirror transistor $T_{104}$ are applied to reference potential GND. A second emitter of the second current mirror transistor $T_{104}$ is connected to the collector of a third npn current mirror transistor $T_{106}$. The emitter of the third current mirror transistor $T_{106}$ is applied to reference potential GND. The collector of the current mirror control transistor $T_{105}$ is connected both via an output stage preresistor $R_{103}$ to the base of the current mirror output transistor $T_{107}$ and via a switching preresistor $R_{102}$ to the base of the third current mirror transistor $T_{106}$. The base of the current mirror control transistor $T_{105}$ is connected to the collector of the second current mirror transistor $T_{104}$, while the emitter thereof is applied to ground potential GND.

For reasons of circuit design, a resistor may also be connected into the emitter path of transistor $T_{101}$. In this case the difference between the two emitter resistors is determinative for the input difference offset voltage and the input switching threshold hysteresis.

The function of this embodiment is based on the fact that each one of the hysteresis comparators HC1, HC2 comprises a switchable current mirror stage CM having a first operating state (current ratio $k_0$) and a second operating state (current ratio $k_1$), with the current mirror stage CM changing its operating state in response to the output signal of the hysteresis comparator HC1, HC2, and that the current mirror stage CM comprises a multi-emitter transistor $T_{104}$, with the second emitter terminal of the multi-emitter transistor $T_{104}$ being connected to ground in response to the output signal of transistor $T_{106}$.

The offset of the switching thresholds is determined by the dimensions chosen for the current source $I_b$, the current ratio $k_0$ of current mirror CM and the resistor $R_{101}$, whereas the hysteresis is determined by the biasing current ($I_b$), the difference of the currents at the two current ratios ($k_0$, $k_1$) of current mirror CM and by resistor $R_{101}$. The ratio of the current mirror currents may be fixed by selecting corresponding dimensions for the emitter areas of the emitters of transistors $T_{103}$ and $T_{104}$.

The described embodiment of the comparator circuit provides the possibility of varying, by changing of the biasing current $I_b$, at the same time offset ($V_{dp-}$, $Vdp_+$) and hysteresis ($V_{dn-} - V_{dp-}$, $V_{dn+} - V_{dp+}$). Upon application in particular in a positioning system, this property provides the possibility of realizing both the noise suppression range and the positioning range of the control system as a function of the supply voltage and thus of achieving a positioning accuracy that is unaffected by the supply voltage. With increasing supply voltage the noise suppression range is thereby equally increased as the interference voltages and the interference immunity reserve remains thus unaffected by the supply voltage.

I claim:

1. A control circuit, in particular for a direct current motor control in positioning systems, comprising:

an input stage having hysteresis-type comparators adapted to have control signals applied thereto, a control logic connected downstream of said input stage, and a driver stage connected downstream of said control logic, characterized in that the input stage comprises:

a differential input having a first input terminal and a second input terminal, and two offset-type hysteresis comparators each having a first comparator input, a second comparator input and a comparator output, each of said hysteresis comparators comprising a switchable current mirror stage, with said current mirror stage changing its switching state in response to the output signal of said hysteresis comparator, said current mirror stage comprising a multi-emitter transistor, with the number of the emitters of said multi-emitter transistor through which current is passed being changed as a function of the switching state of the current mirror, said offset-type hysteresis comparators each having a differential input configuration, and each of said hysteresis comparators having one of said two comparator inputs connected to one of said two input terminals and the other one of said two comparator inputs connected to the other one of said two input terminals, and the comparator inputs of said two hysteresis comparators furthermore being connected to each other such that the inverting comparator input of the first comparator is connected to the non-inverting comparator input of the second comparator and the non-inverting comparator of the first comparator is connected to the inverting comparator input of the second comparator, that the control logic has two control logic inputs connected to one of said comparator outputs each, and that the control circuit comprises two control circuit outputs.

2. A control circuit, in particular for a direct current motor control in positioning systems, comprising:

an input stage having hysteresis-type comparators adapted to have control signals applied thereto, a control logic connected downstream of said input stage, and a driver stage connected downstream of said control logic, characterized in that the input stage comprises:

a differential input having a first input terminal and a second input terminal, and two offset-type hysteresis comparators each having a first comparator input, a second comparator input and a comparator output, each of said hysteresis comparators comprising an emitter-coupled differential amplifier having a first branch and a second branch, a current mirror provided with a control input, and a current mirror switching control means, with said first branch comprising the emitter-collector path of a first transistor and said second branch comprising the emitter-collector path of a second transistor, at least one branch in the emitter circuit of the associated transistor having a series-connected additional resistor, with the resistance thereof or, respectively, the difference between the resistances of the additional resistors in the two emitter circuits having an effect on the value of an offset voltage of the hysteresis comparator, said first transistor and said second transistor being connected on the collector sides to the controllable current mirror, and a decoupling transistor being connected between an output of the current mirror and an output of the hysteresis comparator, the base of said decoupling transistor being connected to the collector of said first transistor, the emitter thereof being at a reference potential and the collector thereof being coupled on the one hand to an output of said hysteresis comparator and being connected on the other hand to the control input of said controllable current mirror, said offset-type hysteresis comparators each having a differential input configuration, and each of said hysteresis comparators having one of said two comparator inputs connected to one of said two input terminals and the other one of said two comparator inputs connected to the other one of said two input terminals, and the comparator inputs of said two hysteresis comparators furthermore being competed to each other such that the inverting comparator input of the first comparator is connected to the non-inverting comparator input of the second comparator and the non-inverting comparator of the first comparator is connected to the inverting comparator input of the second comparator, that the control logic has two control logic inputs connected to one of said comparator outputs each, and that the control circuit comprises two control circuit outputs.

3. A control circuit according to claim 2 wherein omitting said decoupling transistor, the control input of said controllable current mirror is connected to the output of said hysteresis comparator.

4. A control circuit according to claim 2 wherein said controllable current mirror comprises a diode transistor connected as a diode, as well as a multi-emitter transistor, at least one of the emitters of said multi-emitter transistor being applied directly to said reference potential, and at least one additional emitter of said multi-emitter transistor, via a controllable current mirror switch means, being either open or connected to said reference potential.

\* \* \* \* \*

UNITED STATES PATENT AND TRADEMARK OFFICE
CERTIFICATE OF CORRECTION

PATENT NO. : 5,559,416
DATED : September 24, 1996
INVENTOR(S) : Petr Hrassky

It is certified that error appears in the above-indentified patent and that said Letters Patent is hereby corrected as shown below:

In column 10, claim 2, line 39, please delete "competed" and insert therefor --connected--.

Signed and Sealed this

Twenty-first Day of January, 1997

BRUCE LEHMAN

Attest:

*Attesting Officer*              *Commissioner of Patents and Trademarks*